(12) United States Patent
Chang et al.

(10) Patent No.: US 8,248,603 B2
(45) Date of Patent: Aug. 21, 2012

(54) FOCUS APPARATUS OF IMAGE MEASURING SYSTEM

(75) Inventors: Chih-Kuang Chang, Taipei Hsien (TW); Dong-Hai Li, Shenzhen (CN); Li Jiang, Shenzhen (CN); Xian-Yi Chen, Shenzhen (CN); Yi-Rong Hong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 188 days.

(21) Appl. No.: 12/762,382

(22) Filed: Apr. 19, 2010

(65) Prior Publication Data

US 2011/0128427 A1     Jun. 2, 2011

(30) Foreign Application Priority Data

Nov. 30, 2009   (CN) .......................... 2009 1 0310657

(51) Int. Cl.
*G01J 3/28*     (2006.01)

(52) U.S. Cl. ....................................................... 356/328
(58) Field of Classification Search .................. 356/326; 348/306, 315, E50.42, E50.91
See application file for complete search history.

(56) References Cited

U.S. PATENT DOCUMENTS 6,650,916 B2 *   11/2003   Cook et al. .................... 600/322

* cited by examiner

*Primary Examiner* — Tarifur Chowdhury
*Assistant Examiner* — Abdullahi Nur
(74) *Attorney, Agent, or Firm* — Altis Law Group, Inc.

(57) ABSTRACT

A focus apparatus comprises a first illuminator for emitting light onto an object, an optical apparatus, an image capture apparatus for receiving an image of the object through the optical apparatus, and converting the image into electronic signals, a spectroscope, a coaxial light apparatus and a patterned light apparatus. The coaxial light apparatus and the patterned light apparatus are perpendicularly mounted to a spectroscope. The coaxial light apparatus is perpendicular to the patterned light apparatus. The spectroscope refracts patterned light from the patterned light apparatus and coaxial light from the coaxial light apparatus to the optical apparatus.

10 Claims, 6 Drawing Sheets

FOCUS APPARATUS OF IMAGE MEASURING SYSTEM

BACKGROUND

1. Technical Field

Embodiments of the present disclosure relate to measuring apparatus and, more particularly, to a focus apparatus of an image measuring system.

2. Description of Related Art

Auto-focus systems are used in optical measuring instruments, such as image measuring systems. Usually, the image measuring systems use a charge coupled device (CCD) camera to capture an image of a surface of an object, and focus a lens based on the contrast of the image. However, since the image is first captured by a CCD camera, it is difficult to precisely focus on a low contrast surface, such as a reflective surface using the contrast method mentioned above.

What is needed, therefore, is an improving focus apparatus of an image measuring system.

DETAILED DESCRIPTION

Figure 1:
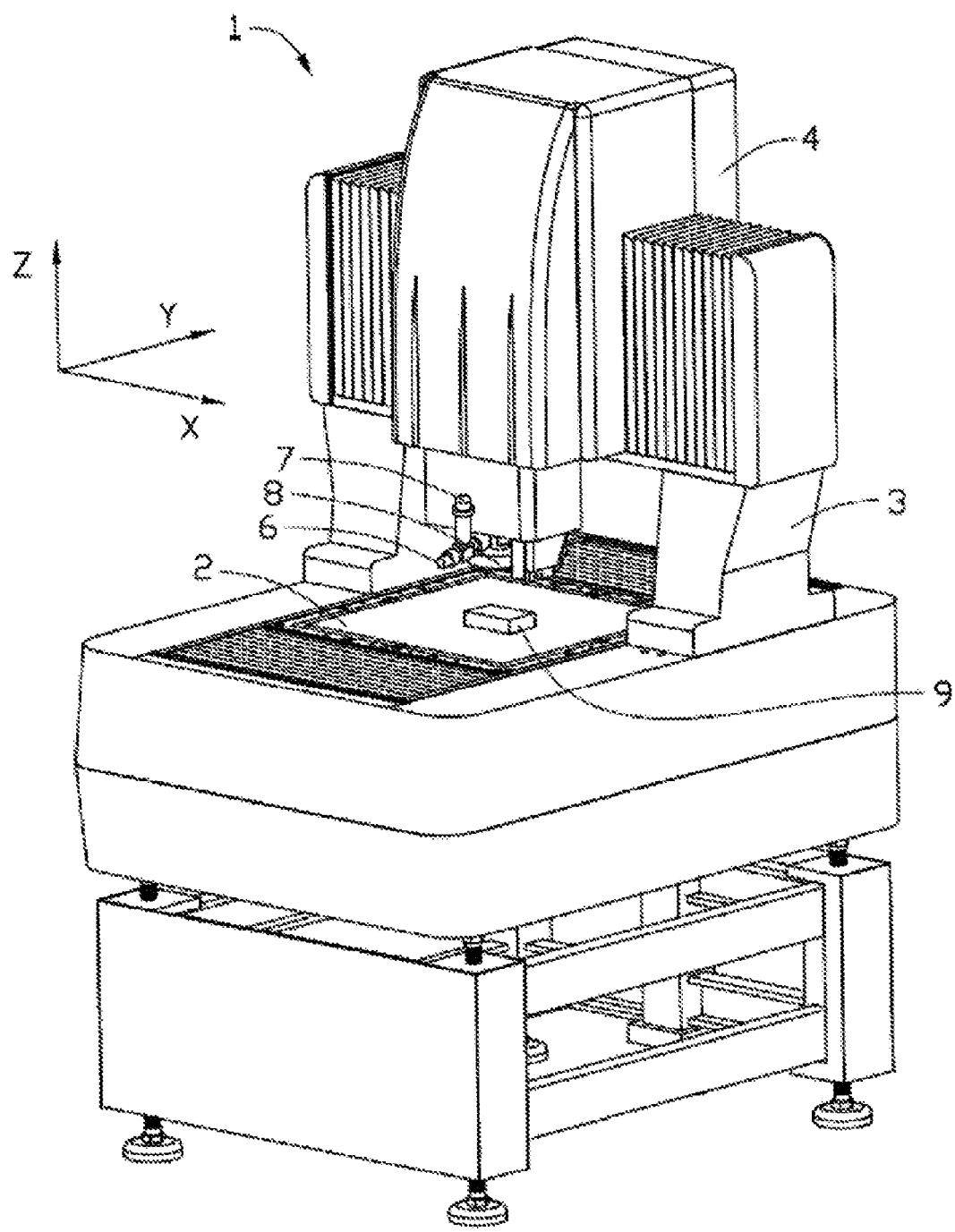
FIG. 1 is an isometric view of one embodiment of an image measuring system.
Figure 6:
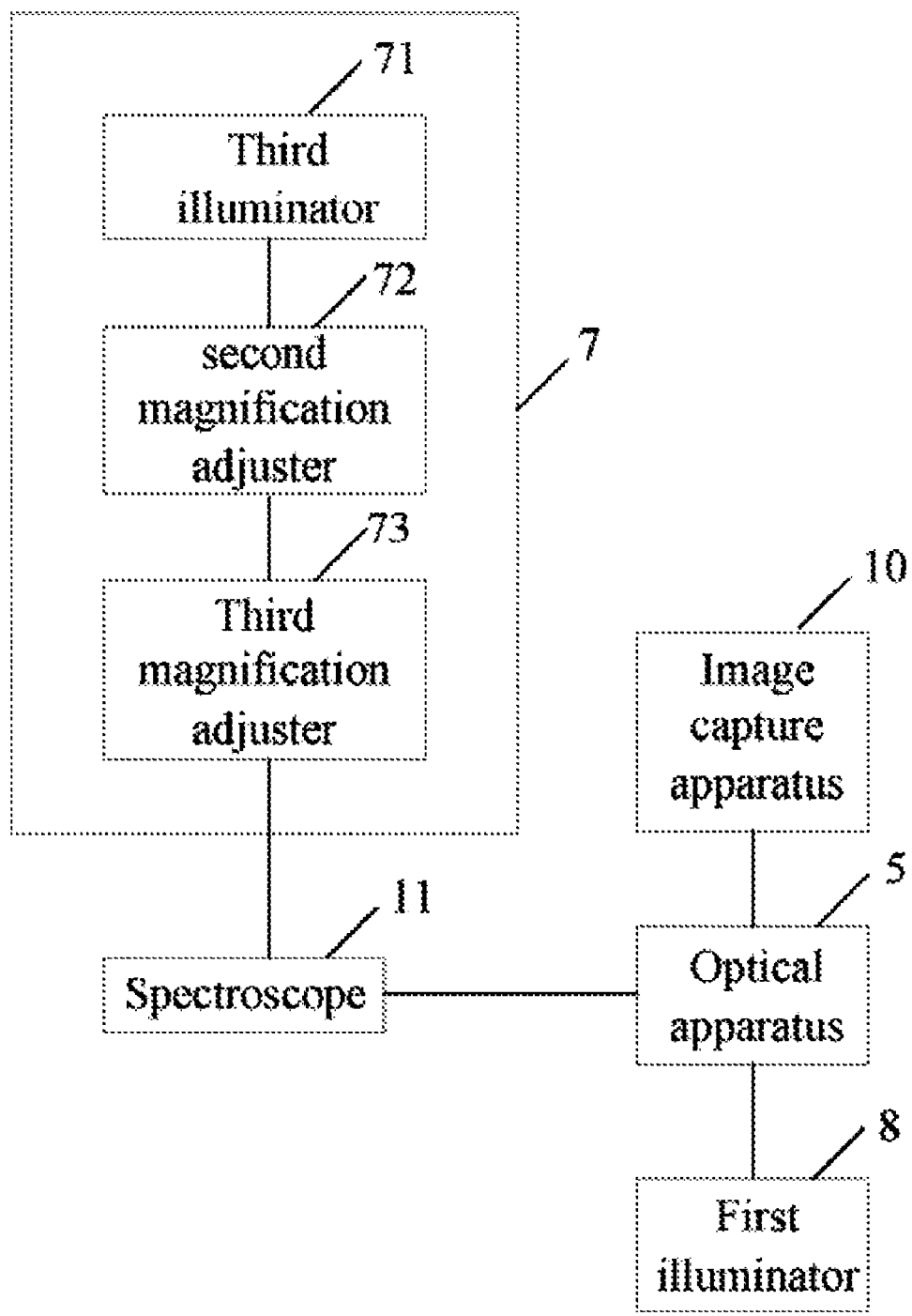
FIG. 6 is a block diagram of one embodiment of the connection among a coaxial light apparatus, the optical apparatus and the image capture apparatus of FIG. 1.

Referring to FIG. 1 and FIG. 6, one embodiment of an image measuring system 1 comprises a horizontal worktable 2, a bracket 3, a top cover 4, and a focus apparatus 100. The focus apparatus 100 comprises an optical apparatus 5, a patterned light apparatus 6, a coaxial light apparatus 7, a spectroscope 11, an image capture apparatus 10, and a first illuminator 8. In one embodiment, the first illuminator may be, but is not limited to, a light emitting diode (LED) illuminator or a laser illuminator. The bracket 3 is mounted to the worktable 2. The top cover 4 is mounted to a middle part of the bracket 3. The optical apparatus 5 and the image capture apparatus 10 are coupled to the top cover 4. An object 9 to be measured is positioned on the worktable 2. The image capture apparatus 10 captures an image of the object 9 via the optical apparatus 5. In one embodiment, the image capture apparatus 10 may be, but is not limited to, a charge coupled device (CCD) camera or a complementary metal oxide semiconductor (CMOS) camera.

Figure 2:
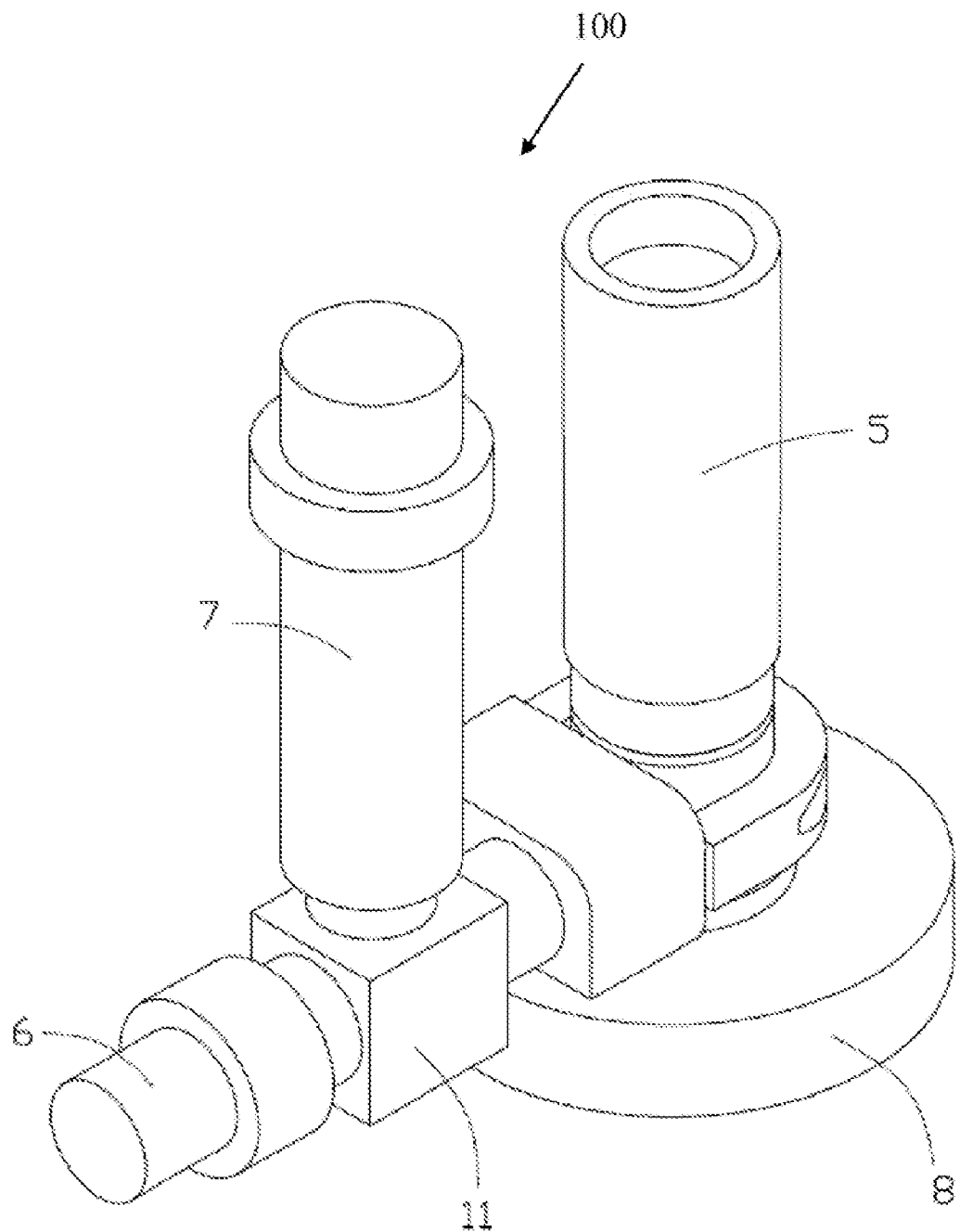
FIG. 2 is an isometric view of a focus apparatus of FIG. 1.
Figure 3:
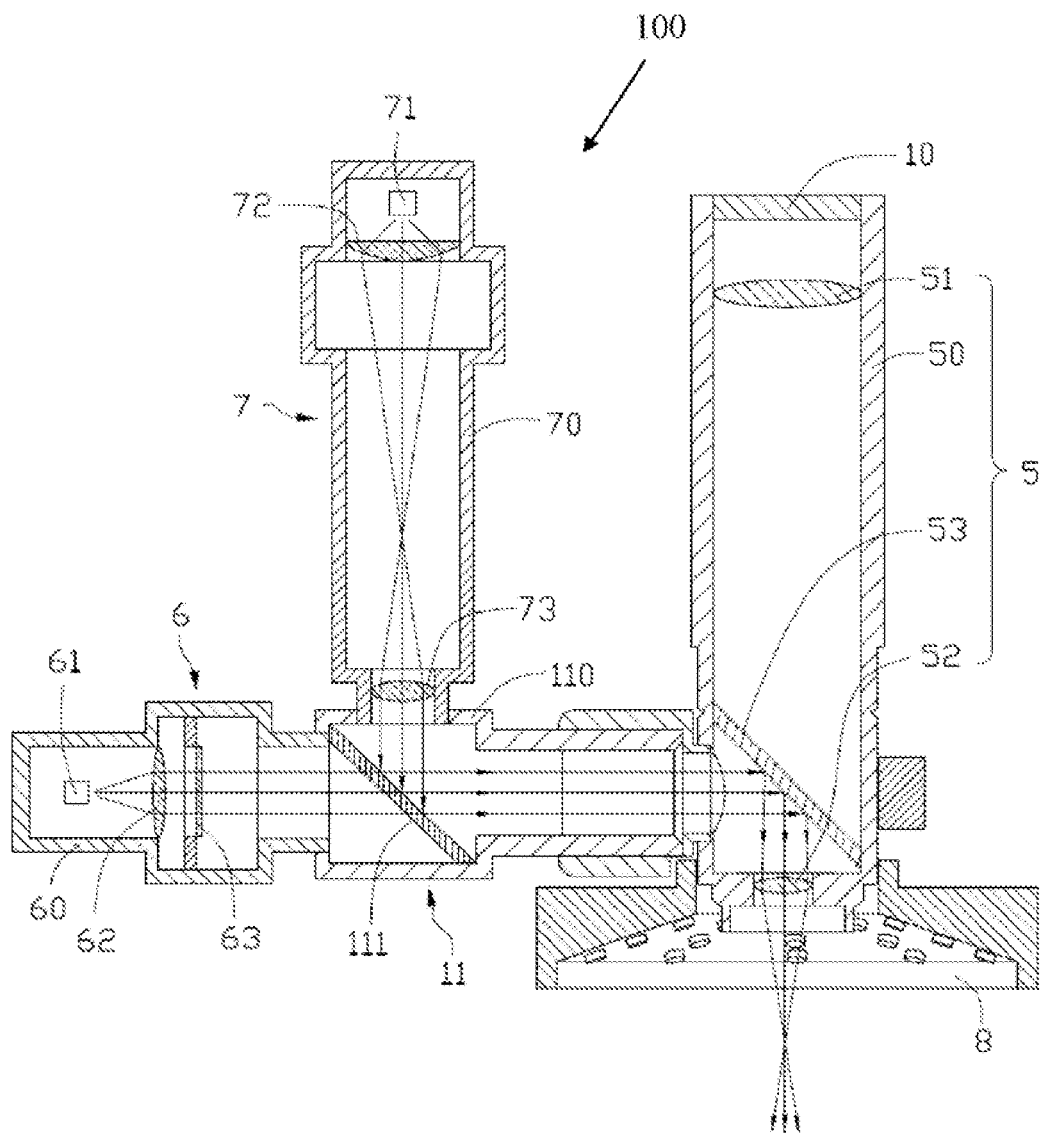
FIG. 3 is a cross-sectional view of FIG. 2.

Referring to FIG. 2 and FIG. 3, the optical apparatus 5 includes a first shell 50, a first object lens 51 mounted to the first end of the first shell 50, a second object lens 52 mounted to the second end of the first shell 50, and a partial reflector 53. The image capture apparatus 10 is mounted to the first end of the first shell 50, opposite to the second object lens 52, and arranged along an optical axis of the optical apparatus 5. The first illuminator 8 is mounted to the second end of the first shell 50, opposite to the first object lens 51, and emits light onto the object 9. The image capture apparatus 10 receives an image of the object 9 through the optical apparatus 5.

The partial reflector 53 is located between the first object lens 51 and the second object lens 52 in the first shell 50. An angle of about 45 degrees is defined between the optical axis of the optical apparatus 5 and the partial reflector 53.

The patterned light apparatus 6 generates patterned light. The patterned light apparatus 6 includes a second shell 60, a second illuminator 61, a first magnification adjuster 62, and a pattern slide 63. The second illuminator 61 is located at a distal end of the second shell 60, and opposite to the spectroscope 11. The second illuminator 61, the first magnification adjuster 62, the pattern slide 63 are located in the second shell 60 in sequence. In one embodiment, the patterned light apparatus 6 generates the patterned light using the second illuminator 61. The second illuminator 61 may be, but is not limited to, a LED illuminator.

Figure 4:
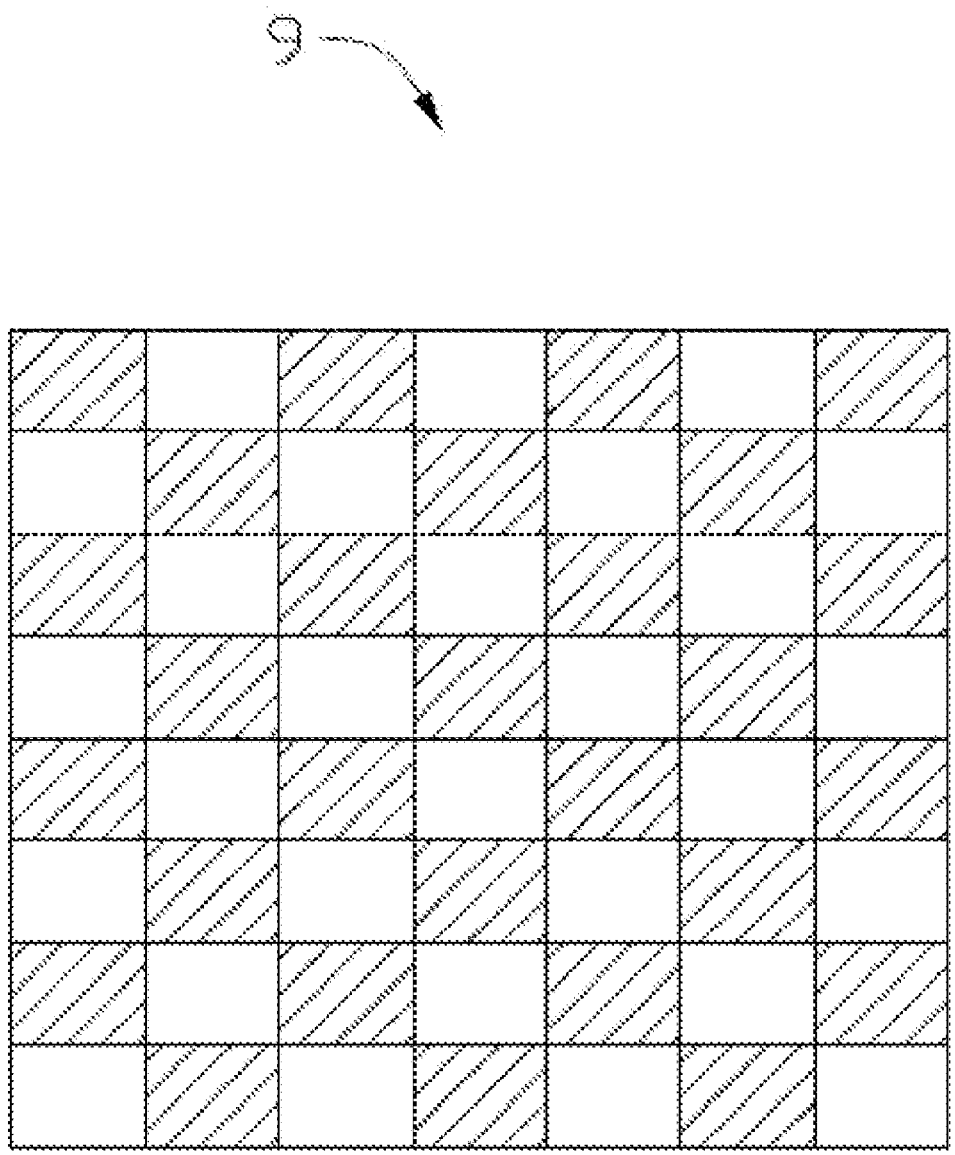
FIG. 4 is a schematic diagram of one embodiment of a pattern slide of FIG. 1.
Figure 5:
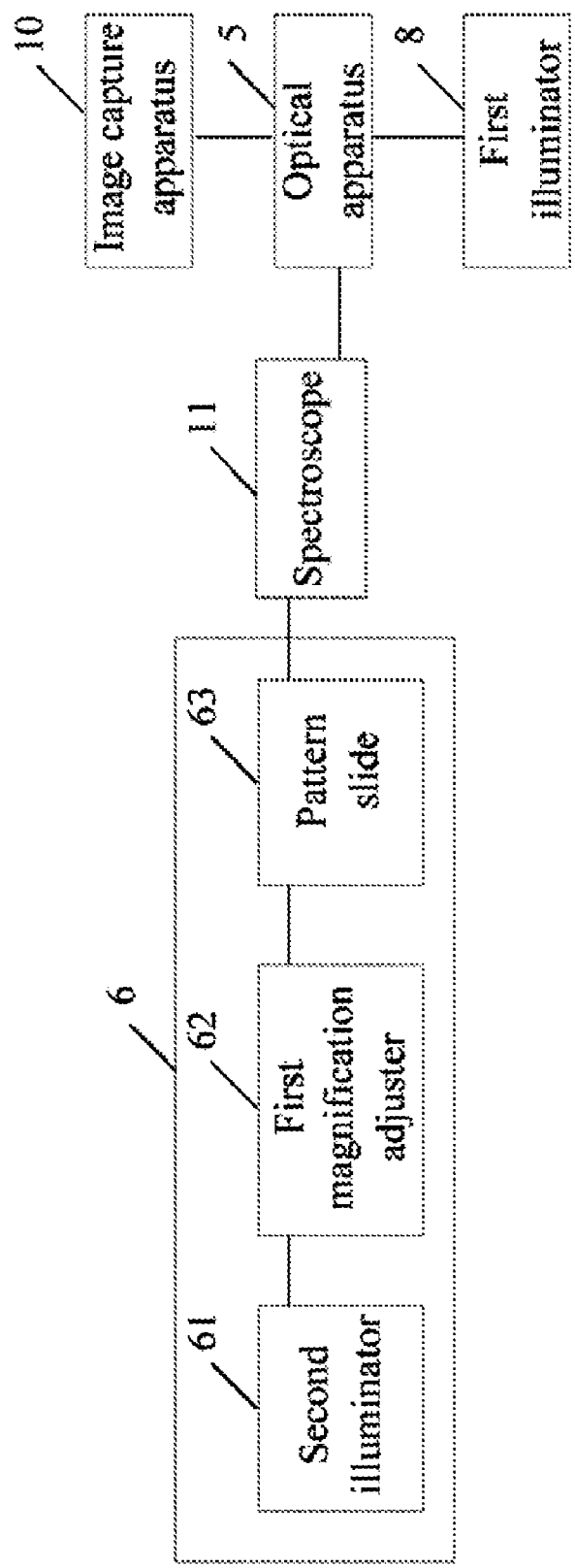
FIG. 5 is a block diagram of one embodiment of the connection among a patterned light apparatus, an optical apparatus and an image capture apparatus of FIG. 1.

Referring to FIG. 4, the pattern slide 63 is a transparent element, such as a glass slide. Patterns, such as a plurality of transparent and nontransparent squares, are formed in a checkerboard fashion on a surface of the pattern slide 63 as shown in FIG. 4. In one embodiment, the patterns of the pattern slide 62 may be formed by specified patterns or images, such as, a floral pattern. The patterned light includes the patterns. In one embodiment, the light emitted from the second illuminator 61 passes through the pattern slide 63, and the patterned light is generated. The patterned light projects patterns on a surface of the object 9.

The coaxial light apparatus 7 generates coaxial light. It should be understood that the coaxial light is a uniform light that runs perpendicular with coaxial light apparatus axis. The coaxial light apparatus 7 includes a third shell 70, a third illuminator 71, a second magnification adjuster 72, and a third magnification 73. The third illuminator 71 is located at a distal end of the third shell 70, and opposite to the spectroscope 11. The third illuminator 71, the second magnification adjuster 72, the third magnification adjuster 73 are located in the third shell 70 in sequence. In one embodiment, the coaxial light apparatus 7 generates the coaxial light using the third illuminator 71. The third illuminator 71 may be, but is not limited to, a LED illuminator.

The spectroscope 11 includes a fourth shell 110 and a prism 111. As shown in FIG. 3, the spectroscope 11 is connected to the patterned light apparatus 6, the coaxial light apparatus 7 and the optical apparatus 10. The patterned light apparatus 6 and the coaxial light apparatus 7 are perpendicularly mounted to a circumference of an end of the spectroscope 11. The patterned light apparatus 6 is perpendicular to the coaxial light apparatus 7. The prism 111 is located in the fourth shell 110. In one embodiment, there is an angle of about 45 degrees between the optical axis of the fourth shell 110 and the prism 111. The prism 111 refracts the light from the third illuminator 71 at an angle of about 90 degrees. In one embodiment, the prism 111 does not refract the light from the second illuminator 61.

If the object 9 has smooth low-contrast surfaces, such as a mirror-finish surface or a glass surface, the second illuminator 61 and the first illuminator 8 are activated. The patterned light emitted from the second illuminator 61 passes through the first magnification adjuster 62, the pattern slide 63, the semi-transparent reflector 53, and the second object lens 52. As a result, the patterns of the surface of the pattern slide 63 are projected onto the surface of the object 9. Light from the first illuminator 8 is projected onto a region to be measured on the surface of the object 9. The optical apparatus 5 focuses light reflected by the surface of the object 9 on an image capturing surface of the image capture apparatus 10. The image capture apparatus 10 captures an image of the surface of the object 9, converts the image into electronic signals, and transmits the electronic signals to a computer system. The computer system computes a focus setting for precise focusing on the object 9 according to the contrast of the image of the object 9.

If the object 9 has smooth high-contrast surfaces, such as a rough metal surface, the third illuminator 71 and the first illuminator 8 are activated. The coaxial light emitted from the third illuminator 71 passes through the second magnification adjuster 72, the third magnification adjuster 73, the semi-transparent reflector 53, and the second object lens 52. Light from the first illuminator 8 is projected onto a region to be measured on the surface of the object 9. The image capture apparatus 7 receives an image of the object 9 through the optical apparatus 5, converts the image into electronic signals, and then transmits the electronic signals to the computer system. The computer system computes a focus setting for precise focusing on the object 9 according to the contrast of the image of the object 9.

The foregoing description of the exemplary embodiments of the disclosure has been presented only for the purposes of illustration and description and is not intended to be exhaustive or to limit the disclosure to the precise forms disclosed. Many modifications and variations are possible in lights of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A focus apparatus, comprising:
    a spectroscope;
    a first illuminator operable to emit light onto an object;
    an optical apparatus operable to generate an image of the object, wherein the optical apparatus comprises a first object lens, a second object lens, and a partial reflector located between the first and second object lens, and the partial reflector is not parallel to the second object lens;
    an image capture apparatus operable to receive the image of the object from the optical apparatus, and convert the image into electronic signals;
    a patterned light apparatus operable to generate patterned light, wherein the patterned light apparatus is perpendicularly mounted to the spectroscope, wherein the patterned light apparatus comprises a second shell, a second illuminator, a first magnification adjuster, and a pattern slide, patterns are formed on a surface of the pattern slide, and the second illuminator is located at a distal end of the second shell and opposite to the spectroscope;
    a coaxial light apparatus operable to generate coaxial light, wherein the coaxial light apparatus is perpendicularly mounted to the spectroscope, and is perpendicular to the patterned light apparatus; and
    the spectroscope operable to refract the patterned light emitted from the patterned light apparatus and the coaxial light emitted from the coaxial light apparatus to the optical apparatus.

2. The focus apparatus of claim 1, wherein the second illuminator is a light emitting diode (LED) illuminator.

3. The focus apparatus of claim 1, wherein the patterned light is generated by the second illuminator and passes through the first magnification adjuster, the pattern slide, the spectroscope, the partial reflector, and the second object lens to project patterns of the surface of the pattern slide onto the surface of the object.

4. The focus apparatus of claim 1, wherein a plurality of transparent square and a plurality of nontransparent square are formed in a checkerboard fashion on the pattern slide.

5. The focus apparatus of claim 1, wherein the coaxial light apparatus comprises a third shell, a third illuminator, a second magnification adjuster, and a third magnification adjuster, and wherein the third illuminator is located at a distal end of the third shell and opposite to the spectroscope.

6. The focus apparatus of claim 5, wherein the third illuminator is a LED illuminator.

7. The focus apparatus of claim 5, wherein the coaxial light is generated by the third illuminator and passes through the second magnification adjuster, the third magnification, the spectroscope, the partial reflector, and the second object lens to project the coaxial light onto the surface of the object.

8. The focus apparatus of claim 1, wherein the spectroscope comprises a fourth shell and a prism.

9. The focus apparatus of claim 1, wherein the first illuminator is a LED illuminator or a laser illuminator.

10. The focus apparatus of claim 1, wherein the optical apparatus is a charge coupled device (CCD) camera or a complementary metal oxide semiconductor (CMOS) camera.

* * * * *